June 23, 1931.  R. J. GILMORE ET AL  1,811,387
RECORD MAKING MECHANISM
Filed Feb. 7, 1927
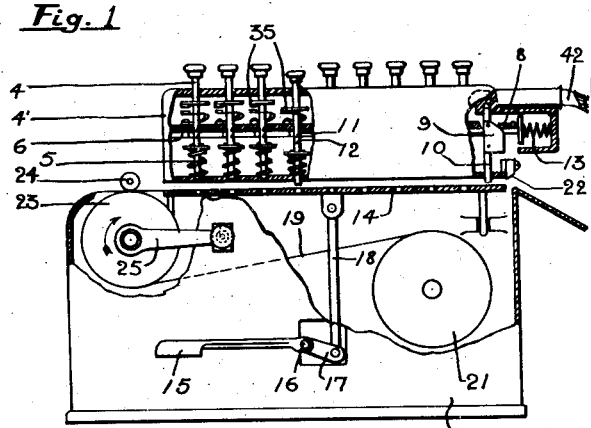
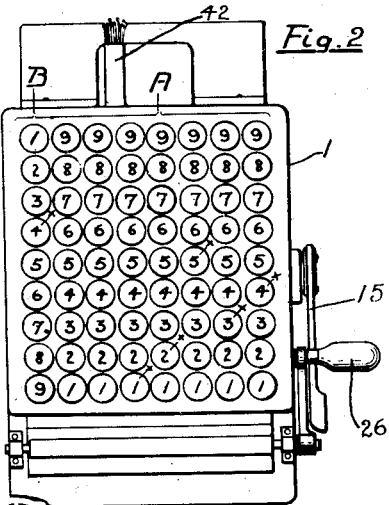
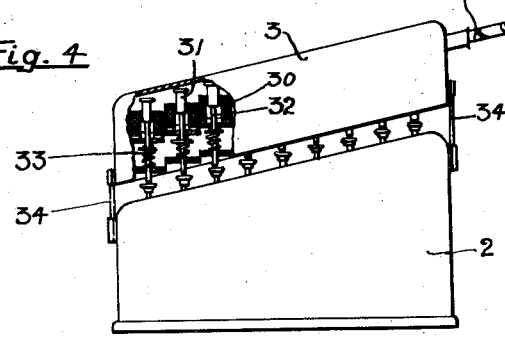
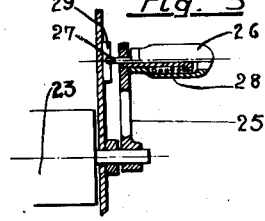
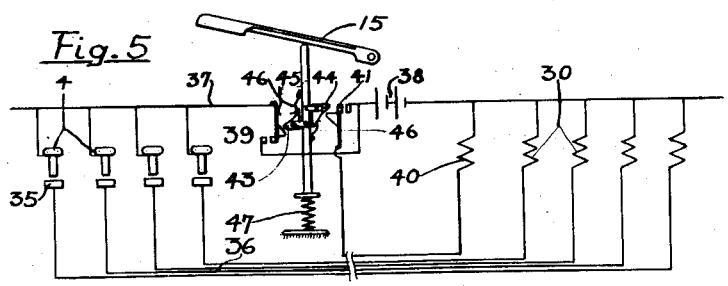
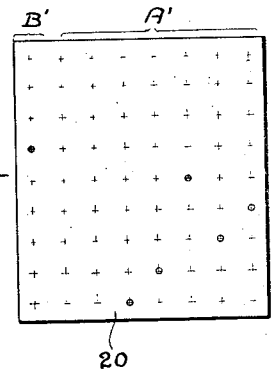
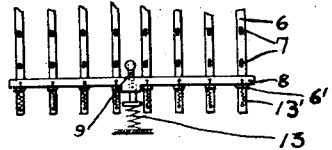
R. J. Gilmore,
L. W. Langford  INVENTORS.
BY Lawrie L. Witter
ATTORNEY.

Patented June 23, 1931

1,811,387

UNITED STATES PATENT OFFICE

ROGER J. GILMORE AND LEONARD W. LANGFORD, OF BOSTON, MASSACHUSETTS; SAID GILMORE ASSIGNOR TO SAID LANGFORD

RECORD MAKING MECHANISM

Application filed February 7, 1927. Serial No. 166,472.

This invention relates to record making mechanism particularly adapted for use in connection with an adding or like machine for making a punched record of each item recorded by such machine, the invention being broadly disclosed in a co-pending application, Serial No. 162,367 to L. W. Langford, and similar in some respects thereto.

It is well known that a large part of the work done on adding machines comprises the recording and totaling of amounts in conjunction with the classification of the various items. Usually such amounts are first recorded with or without a classification number in order to secure a general total, which must later balance with the sum of the totals of the various classification groups. For this class of work adding machines with a permanent or variable split keyboard are frequently used. The classifying or descriptive numbers to the left of the split are usually not added but merely indicated on the item strip.

After the items have all been recorded and totaled on the adding machine strip it is then necessary, in most work of this character, to sort the items into their different classification groups and record each group on the adding machine in order to get these respective classification or group totals. For example, a bank is interested not only in the total number or amount of the checks passing through its hands but it is also necessary to secure various sub-totals of these checks, classified in accordance with the various requirements. Again, a merchant desires to know not only the total of his sales but also the sub-total of each department, etc.

The above mentioned co-pending application specifically discloses a mechanism wherein a punched record of each item listed on an adding machine is automatically made by a punch-press automatically controlled by the adding machine; and broadly discloses a modification thereof wherein the punch-press is operated manually and the adding machine is controlled therefrom and operated automatically. Our invention herein relates to this latter form of mechanism and it is the primary object of the invention to provide such a mechanism which can be used in conjuction with or as an attachment to an adding machine and which will automatically operate an adding machine to list each item thereon simultaneously with the operation of the punch-press to make punched records thereof.

More specifically our invention comprises a punch-press having a plurality of punches, preferably of the type adapted to be set to the punching position before performing the punching operation. Cooperating with each punch is a switch, each connected with a solenoid cooperating with the corresponding key of an adding machine and adapted to operate the adding machine keys when the solenoids are energized. The arrangement is preferably such that the solenoids are energized and the keys depressed only when performing the punching operation, this feature making it possible to correct any punch-setting errors before performing the punching operation and before selecting the corresponding adding machine keys. Other mechanism herein described is provided for performing the punching operation, for automatically releasing the set punches after each punching operation, and for automatically causing the adding machine to function after its keys corresponding to the set punches have been depressed. It is a further object of our invention to provide a mechanism of this general type and for the purpose defined.

In the accompanying drawings we have illustrated one specific embodiment of our invention, but it will be understood that the invention can be otherwise embodied and that the drawings are not to be construed as defining or limiting the scope of the invention, the claims appended hereto being relied upon for that purpose.

Referring to the figures of the drawings:

Fig. 1 is a side elevation, partly in section, of a punch-press illustrating our invention.

Fig. 2 is a plan view thereof.

Fig. 3 is a detail view of the paper feeding means.

Fig. 4 is a side elevation of an adding machine and means for controlling the operation thereof from the punch-press.

Fig. 5 is a wiring diagram of the connections between the punch-press and the adding machine.

Fig. 6 illustrates one of the punched records.

Fig. 7 is a detail view of the punch releasing means.

Our invention as illustrated herein comprises a punch-press 1, an adding machine 2, and a controlling and operating member 3 mounted on the adding machine keyboard. The key or punch board of the punch-press may be similar or identical to the keyboard of the adding machine and is operated in a similar manner. Mechanism embodied therein and connected to the member 3 automatically controls the operation of the adding machine whereby the items for which punched records are made on the punch-press 1 are automatically listed on the adding machine 2.

The punch-press illustrated has seven rows of amount punching keys A, with nine keys in each row numbered 1 to 9 inclusive, and one row of classification keys B, numbered 1 to 9 inclusive in the reverse direction. Each of these keys is mounted on a punch 4 normally held in the raised position by a spring 5. It will be understood that a punch 4 is provided for each key of the adding machine, i. e., sixty-three punches for the sixty-three amount keys of the adding machine and nine punches for the nine classification keys of the adding machine.

As a means for holding the punches depressed or set, we provide a plurality of bars 6, one for each of the eight rows of punches. Each of these bars is slotted at 7 to receive the punches therethrough. A lug 6' on each of these bars is engaged by a crossbar 8 adapted to be automatically moved by a cam 9 on a sliding bolt 10 to release the set punches. Each punch has upper and lower notches 11 and 12 therein and into one of which the bar 6 is normally engaged by means of a main spring 13 and smaller springs 13'. When a punch is in the up position the bar engages in the lower notch 12. When the punch is depressed the bar snaps into the notch 11 and holds the punch depressed. When the die plate 14 is moved upwardly in the punching operation, the bolt 10 and cam 9 are raised in a manner sliding all the bars 6 against the action of the spring 13 and releasing the set punches.

The punching operation can be performed either manually or by power and as a convenient means of manually operating the same we have illustrated a lever 15 on a shaft 16 having an arm 17 thereon connected by a link 18 to the die plate 14. Depressing of the lever 15 raises the die plate and punches the record paper 19 wherever a punch is set in the depressed position one punch being thus illustrated in Fig. 1.

The punched records 20 are preferably made from a continuous roll 21 of paper 19 which after being fed to the punch-press and punched is automatically cut off by a knife 22 to form independent tickets. Such a ticket is shown in Fig. 6, the punching positions being indicated by crosses. It will be noted that the sixty-three amount punches A' are set in seven rows of nine punches each and the nine classification punches B' are positioned in one row adjacent thereto. The sorting of the records is automatically controlled by the nine classification punchings. Ordinarily the classification punching may be used and is sufficient to control the operation of the auditing machine in the auditing operation, the use of such punching for this purpose therefore eliminating the necessity of providing another punched hole in each record for performing such operation.

The ticket forming paper 19 extends from the continuous roll 21 around a roll 23 and between such roll and a cooperating idler roll 24. The roll 23 is operated by an arm 25 provided with a handle 26. A pin 27 on the handle is normally projected by a spring 28 into the path of a stop 29. The circumference of the roll is equal to the length of a sales ticket 20 and therefore one rotation of the roll 23 feeds one ticket-length of paper between the die 14 and punch-head 4'. The pin 27 can be withdrawn to permit rotation of the roll 23 to feed the paper and when the pin again engages the stop 29 the roll has been rotated through one revolution and has fed the paper 19 the length of one ticket 20.

The member 3 is of box-like form and carries a plurality of solenoids 30 therein, each provided with an armature 31 carrying a downwardly extending pin 32. Each armature and pin are normally held in the raised position by a spring 33. A solenoid 30 is provided for each key of the adding machine and these solenoids are so arranged that when the member 3 is mounted on the adding machine the pins 32 respectively rest on the keys. When thus arranged it will be obvious that the energizing of a solenoid will draw its armature downwardly and depress the corresponding key. The member 3 may be held in place on the adding machine by latches 34.

Cooperating with each punch 4 is a switch 35 and the terminals of each such switch are connected to the terminals of the corresponding solenoid 30 in the manner illustrated in Fig. 5. The construction of the switches 35 is such that the depressing of a punch 4 closes its switch 35, the switch being held thus closed while the punch is held depressed by the bar 6.

Referring more particularly to Fig. 5 it will be seen that one terminal of each of the several switches 35 is connected to one terminal of each of the corresponding solenoids by an independent wire 36. The other terminals are all connected by a common wire 37 through a battery 38 and a normally open switch 39. Another solenoid 40 mounted in the member 3 and like the solenoids 30, is so positioned as to depress the operating key of the adding machine when energized. The terminals from this solenoid extend through the battery 38 and a normally open switch 41. The wires 36 and 37 are carried in a cable 42 connecting the punch-press head 4' with the adding machine operating member 3.

The normally open switches 39 and 41 are automatically closed when performing punching operation in the following manner: A pair of elements 43 and 44 are pivotally mounted on a rod 45 and each normally held in the position illustrated by a spring 46. The rod is normally held in the raised position by a spring 47 and is adapted to be moved downwardly when the die 14 is moved upwardly by the depressing of the lever 15. When the rod moves downwardly the element 43 engages and closes the switch 39, the weak spring 46 permitting the element 44 to pivot outwardly in passing the switch 41. When the rod moves upwardly the element 44 engages and closes the switch 41, the weak spring 46 permitting the element 43 to pivot outwardly in passing the switch 39.

The operation of the mechanism illustrated and above described may be briefly defined as follows.

Assuming that the several parts are all in their normal position and that a paper 19 extends over the die-plate 14 beneath the punches 4, the operator manipulates the keys A and B by depressing the same in the usual manner of operating adding machines. Assuming, for example, that the first item to be recorded is in classification #4 and for $125.34. The operator depresses the #4 key in the classification column B and the 1, 2, 5, 3 and 4 keys in the five amount columns A, as indicated by x in Fig. 2. The bars 6 immediately snap into the notches 11 and hold the punches depressed. It will also be noted that the switches 35 are closed when their punches are depressed. The closing of such switches, however, does not affect the solenoids 30 since the circuit is interrupted by the open switch 39. Should the operator find that he has depressed a wrong key he need only depress the correct key in that column, the wrong key automatically snapping back to its normal position since the springs 13' permit individual sliding movement of the bars 6.

Assuming that the keys marked x in Fig. 2 have been properly depressed, the operator then depresses the lever 15. This operation first closes the switch 39, whereupon the solenoids 30 corresponding to the set punches are energized and depress their adding machine keys. The raising of the die-plate 14 performs the punching operation and severs the ticket by means of the knife 22 which is carried by the die-plate. The cam 9 has then been raised sufficiently to move the bar 6 and release all the set punches. Movement of the rod 45 upward closes the switch 41 and energizes the solenoid 40, which depresses the operating key of the adding machine. The operator then rotates the feed roll 23 until the pin 27 engages the stop 9. This operation feeds a new ticket-length of paper over the die 14. The cycle of operations has now been completed and the machine is ready for the next item.

It will be understood that we have herein illustrated our invention in a comparatively simple form for purposes of clarity and with no intention of limiting the invention thereto. For example, it is understood that many forms of punching and punch setting mechanisms are well known and in common use, and the scope of the invention herein is intended to embody these various forms and obvious modifications of any and all parts of the invention.

We claim:

1. An apparatus for making records, comprising the combination of a punch press having a plurality of record-forming punches, a member adapted to be superposed over the keyboard of an adding or like machine and having a plurality of key operating elements so arranged as to adapt the elements to operate the keys of such machine when the member is thus superposed, means for moving the said elements to perform their key operating function, and means forming connections between the punch press and first named means whereby the elements corresponding to the punches selected and operated are caused to function.

2. An apparatus for making records, comprising the combination of a punch press having a plurality of record-forming punches, a plurality of switches respectively co-operating with the punches, a member adapted to be superposed over the keyboard of an adding or like machine and having a plurality of key operating elements so arranged as to adapt the elements to operate the keys of such machine when the member is thus superposed, means for moving the said elements to perform their key operating function, and means forming connections between the switches and the first named means whereby the elements corresponding to the punches depressed are operated.

3. An apparatus for making records, comprising the combination of a punch press having a plurality of record-forming punches, cooperating means whereby a selected punching condition of said punches can be set up, means for performing the punching operation, a member adapted to be superposed over the keyboard of an adding or like machine and having a plurality of key operating elements so arranged as to adapt the elements to operate the keys of such machine when the member is thus superposed, means for moving the said elements to perform their key operating function, and means for causing the last named means to operate the elements which correspond to the selected punches when the punching operation is performed.

4. An apparatus for making records, comprising the combination of a punch press having a plurality of record-forming punches, cooperating means whereby a selected punching condition of said punches can be set up, means for performing the punching operation, a member adapted to be superposed over the keyboard of an adding or like machine and having a plurality of key operating elements so arranged as to adapt the elements to operate the keys of such machine when the member is thus superposed, means for moving the said elements to perform their key operating function, means for causing the last named means to operate the elements which correspond to the selected punches when the punching operation is performed, and means for thereafter automatically returning the set-up portion of the punching mechanism to normal condition.

5. An apparatus for making records, comprising the combination of a punch press having a plurality of record-forming punches, switches respectively cooperating with the punches in such manner that the switches are closed as their corresponding punches are depressed, a member adapted to be superposed over the keyboard of an adding or like machine and having a plurality of key operating elements so arranged as to adapt the elements to operate the keys of such machine when the member is thus superposed, solenoids respectively cooperating with the elements in a manner adapted to move the elements to perform their key operating function when the solenoids are energized, and means respectively forming connections between the switches and the corresponding solenoids.

6. An apparatus for making records, comprising the combination of a punch press having a plurality of record-forming punches, cooperating means whereby a selected punching condition of said punches can be set up, means for performing the punching operation, a member adapted to be superposed over the keyboard of an adding or like machine and having a plurality of key operating elements so arranged as to adapt the elements to operate the keys of such machine when the member is thus superposed, solenoids respectively cooperating with the elements in a manner adapted to move the elements to perform their key operation function when the solenoids are energized, and means including switches and connections from the punch press to the solenoids for causing the solenoids corresponding to the selected punches to be energized when the punching operation is performed.

7. An apparatus for making records, comprising the combination of a punch press having a plurality of record-forming punches, cooperating means whereby a selected punching condition of said punches can be set up, a plurality of switches corresponding to the punches and cooperating with the first named means in such manner that the setting up of the said punching condition closes the switches corresponding to the selected punches thereof, means for performing the punching operation, a member adapted to be superposed over the keyboard of an adding or like machine and having a plurality of key operating elements so arranged as to adapt the elements to operate the keys of such machine when the member is thus superposed, solenoids respectively cooperating with the elements in a manner adapted to move the elements to perform their key operating function when the solenoids are energized, connections and switch means therein from the first named switches to the solenoids, and means for closing the said switch means in a manner causing the selected solenoids to be energized when the punching operation is performed.

8. An apparatus for making records, comprising the combination of a punch press having a plurality of record-forming punches, cooperating means whereby a selected punching condition of said punches can be set up, means for performing the punching operation, a member adapted to be superposed over the keyboard of an adding or like machine and having a plurality of key operating elements so arranged as to adapt the elements to operate the keys of such machine when the member is thus superposed, means for moving the said elements to perform their key operating function, means for causing the last named means to operate the elements which correspond to the selected punches when the punching operation is performed, means carried by the said member for depressing the operating key of the adding or like machine, and means under the control of the punch press for automatically causing the last said means to function when the punching operation is performed.

9. An apparatus for making records, comprising the combination of a punch press having a plurality of record-forming punches, switches respectively cooperating with the punches in such manner that the switches are closed as their corresponding punches are depressed, a member adapted to be superposed over the keyboard of an adding or like machine and having a plurality of key operating elements so arranged as to adapt the elements to operate the keys of such machine when the member is thus superposed, solenoids respectively cooperating with the elements in a manner adapted to move the elements to perform their key operating function when the solenoids are energized, means respectively forming connections between the switches and the corresponding solenoids, electrically operated means carried by the said member for depressing the operating key of the adding or like machine, and a switch carried by the punch press whereby the last named means can be caused to function after each key depressing operation of the said elements.

In testimony whereof we affix our signatures.

ROGER J. GILMORE.
LEONARD W. LANGFORD.